United States Patent
Ashmore et al.

(10) Patent No.: US 7,767,729 B2
(45) Date of Patent: Aug. 3, 2010

(54) METHOD FOR REDUCING ODOR IN LATEX PAINTS

(75) Inventors: John William Ashmore, Lansdale, PA (US); Thu-Ba Thi Tran, Willow Grove, PA (US); Janet Nadya Younathan, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 173 days.

(21) Appl. No.: 12/069,362

(22) Filed: Feb. 8, 2008

(65) Prior Publication Data

US 2008/0194728 A1    Aug. 14, 2008

Related U.S. Application Data

(60) Provisional application No. 60/900,596, filed on Feb. 9, 2007, provisional application No. 60/920,306, filed on Mar. 27, 2007.

(51) Int. Cl.
  *C08K 5/3415*  (2006.01)
  *C08K 5/37*    (2006.01)
  *C08K 5/06*    (2006.01)
  *C09D 5/14*    (2006.01)

(52) U.S. Cl. .................... 523/102; 523/122; 524/42; 524/44; 524/99; 524/323; 106/16

(58) Field of Classification Search ............ 523/102, 523/122; 524/42, 99, 323, 44; 106/16
See application file for complete search history.

(56) References Cited

U.S. PATENT DOCUMENTS

| 4,079,028 | A |   | 3/1978 | Emmons et al. |
| 4,102,843 | A |   | 7/1978 | Sperry et al. |
| 5,373,016 | A |   | 12/1994 | Brown et al. |
| 5,421,875 | A | * | 6/1995 | Chambers et al. ........... 106/243 |
| 5,583,214 | A | * | 12/1996 | Partain, III .................... 536/84 |
| 6,437,020 | B1 |   | 8/2002 | Amick et al. |
| 6,858,697 | B2 |   | 2/2005 | Mayorga et al. |
| 2003/0023906 | A1 |   | 1/2003 | Nishimura et al. |
| 2003/0177951 | A1 | * | 9/2003 | Gilli ........................... 106/464 |
| 2003/0186003 | A1 | * | 10/2003 | Nakano et al. ............. 428/32.1 |

FOREIGN PATENT DOCUMENTS

| EP | 1300438 |   | 4/2003 |
| JP | 05271015 | A * | 10/1993 |
| JP | 07133206 | A * | 5/1995 |

* cited by examiner

*Primary Examiner*—Tae H Yoon
(74) *Attorney, Agent, or Firm*—Kenneth Crimaldi

(57) ABSTRACT

A method for reducing odor arising from surfaces coated with latex paints. The method comprises combining in a latex paint: (i) at least one stabilizer; (ii) at least isothiazolone one biocide comprising 2-methyl-4-isothiazolin-3-one or 2-n-octyl-4-isothiazolin-3-one; and (iii) at least one thickener comprising a polyurethane, hydroxyethyl cellulose, carboxymethyl cellulose, an alkali soluble emulsion polymer, a hydrophobically modified alkali soluble emulsion polymer or a hydrophobically modified hydroxyethyl cellulose.

8 Claims, No Drawings

METHOD FOR REDUCING ODOR IN LATEX PAINTS

This application claims the benefit of priority under 35 U.S.C. §119(e) of U.S. Provisional Patent Application No. 60/900,596 filed on Feb. 9, 2007 and U.S. Provisional Patent Application No. 60/920,306 filed on Mar. 27, 2007.

This invention relates to a method for reducing odor arising from surfaces coated with latex paints.

Under some environmental conditions, including high heat, humidity and ozone, basic latex paints preserved with certain 3-isothiazolone biocides emit an undesirable odor after application and drying. Copper salts have been used as preservatives for the isothiazolone biocides in an attempt to reduce this odor, but use of copper is undesirable due to coloring of the paint.

Addition of 4-hydroxy-2,2,6,6-tetramethylpiperidinoxyl (4-hydroxy TEMPO) or diethyl hydroxylamine to stabilize polyurethane thickeners used in latex paints was disclosed in U.S. Pat. No. 6,437,020. However, a non-metallic stabilizer for reducing odor in latex paints containing 3-isothiazolones has not been described.

The problem addressed by this invention is to provide a method for reducing odor from surfaces coated with latex paints containing 3-isothiazolones.

STATEMENT OF THE INVENTION

The present invention is directed to a method for reducing odor arising from surfaces coated with latex paints. The method comprises combining in a latex paint: (i) at least one stabilizer comprising 4-hydroxy-2,2,6,6-tetramethylpiperidinoxyl, a hindered phenol, a hindered amine, an unsaturated fatty acid, nicotinamide, a thiodicarboxylic acid or an N,N-dialkylhydroxylamine; (ii) at least one isothiazolone biocide comprising 2-methyl-4-isothiazolin-3-one or 2-n-octyl-4-isothiazolin-3-one; and (iii) at least one thickener comprising a hydroxyethyl cellulose, a carboxymethyl cellulose, an alkali soluble emulsion polymer, a hydrophobically modified alkali soluble emulsion polymer or a hydrophobically modified hydroxyethyl cellulose.

In one embodiment of the invention, the method comprises combining in a latex paint: (i) at least one stabilizer comprising a hindered phenol, a hindered amine, an unsaturated fatty acid, nicotinamide, or a thiodicarboxylic acid; (ii) at least one isothiazolone biocide comprising 2-methyl-4-isothiazolin-3-one or 2-n-octyl-4-isothiazolin-3-one; and (iii) at least one thickener comprising a polyurethane, a hydroxyethyl cellulose, a carboxymethyl cellulose, an alkali soluble emulsion polymer, a hydrophobically modified alkali soluble emulsion polymer or a hydrophobically modified hydroxyethyl cellulose.

DETAILED DESCRIPTION OF THE INVENTION

"MIT" is 2-methyl-4-isothiazolin-3-one, also referred to by the name 2-methyl-3-isothiazolone. "CMIT" is 5-chloro-2-methyl-4-isothiazolin-3-one, also referred to by the name 5-chloro-2-methyl-3-isothiazolone. "OIT" is 2-n-octyl-4-isothiazolin-3-one, also referred to by the name 2-n-octyl-3-isothiazolone. "BIT" is 1,2-benzisothiazolin-3-one. "(Meth)acrylic" or "(meth)acrylate" refer to acrylic or methacrylic, and acrylate or methacrylate, respectively. An "alkyl" group is a saturated hydrocarbyl group having from one to twenty carbon atoms in a linear, branched or cyclic arrangement. In one preferred embodiment, alkyl groups are acyclic. In one preferred embodiment, alkyl groups have from one to eight carbon atoms, alternatively from one to four carbon atoms.

The following abbreviations are used throughout the specification: ppm=parts per million by weight (weight/weight), mL=milliliter, AI=active ingredient, i.e., total amount of isothiazolones. Unless otherwise specified, temperatures are in degrees centigrade (° C.), and references to amounts or percentages are by weight.

Combinations of the listed stabilizers may be used, with or without additional stabilizers. Hindered phenol stabilizers suitable for use in this invention include, e.g., 2,6-di-tert-butyl-4-methylphenol (BHT), 2,6-di-tert-butyl-4-methoxyphenol, 2-tert-butyl-4-hydroxyanisole (BHA), propyl 3,4,5-trihydroxybenzoate, 2-(1,1-dimethylethyl)-1,4-benzenediol, 2,5-di-tert-butylhydroquinone, 4-tert-butylcatechol; pentaerythritol, tetrakis(3-(3,5-di-tert-butyl-4-hydroxyphenyl) propionate) (available from Ciba Corp. as IRGANOX 1010); octadecyl-3-(3,5-di-tert-butyl-4-hydroxyphenyl)-propionate (available from Ciba Corp. as IRGANOX 1076); and 2',3-bis [[3-[3,5-di-tert-butyl-4-hydroxyphenyl]propionyl]]propionohydrazide (available from Ciba Corp. as IRGANOX MD 1024). Hindered amine stabilizers suitable for use in this invention include, e.g., 4-hydroxy-2,2,6,6-tetramethylpiperidine, TINUVIN 770, diphenylpicrylhydrazyl, N-methylaniline, diphenylamine, tetra-benzyl-p-phenylenediamine; 1,3,5-triazine-2,4,6-triamine,N,N'''-[1,2-ethane-diyl-bis [[[4,6-bis-[butyl (1,2,2,6,6-pentamethyl-4-piperidinyl) amino]-1,3,5-triazine-2-yl]imino]-3,1-propanediyl]]bis[N', N''-dibutyl-N',N''-bis(1,2,2,6,6-pentamethyl-4-piperidinyl)- (available from Ciba Corp. as CHIMASSORB 119 FL); 1,6-Hexanediamine, N,N'-bis(2,2,6,6-tetramethyl-4-piperidinyl)-polymer with 2,4,6-trichloro-1,3,5-triazine, reaction products with N-butyl-1-butanamine an N-butyl-2,2,6,6-tetramethyl-4-piperidinamine (available from Ciba Corp. as CHIMASSORB 2020); and Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) (available from Ciba Corp. as CHIMASSORB 944). A particularly preferred N,N-dialkylhydroxylamine is N,N-diethylhydroxylamine.

Fatty acids are acyclic aliphatic carboxylic acids containing from 8 to 24 carbon atoms; typically, they contain from 12 to 22 carbon atoms. With respect to carbon-carbon bonds, fatty acids may be saturated or unsaturated. Unsaturated fatty acids may be monounsaturated or polyunsaturated (typically 2 or 3 carbon-carbon double bonds). Polyunsaturated fatty acids or their derivatives are preferred as stabilizers. Particularly preferred polyunsaturated fatty acids include, e.g., linolenic acid, stearidonic acid, ecosatetraenoic acid, eicosapentaenoic acid, clupanodonic acid, docosahexaenoic acid, linoleic acid, ecosadienoic acid, arachidonic acid, docosadienoic acid, adrenic acid, docosapentaenoic acid, mead acid, rumenic acid, calendic acid, jacaric acid, eleostearic acid, catalpic acid, pucinic acid, rumelenic acid, parinaric acid, and bosseopentaenoic acid. Derivatives include salts, alkyl esters, diglycerides, and triglycerides. Particularly preferred derivatives are diglycerides and triglycerides.

Thiodicarboxylic acids include, e.g., 3,3'-thiodipropionic acid and 3,3'-thiodiacetic acid.

Preferably, the stabilizer(s) is present in the latex paint at a total level from 10 ppm to 2000 ppm. In one embodiment of the invention, the stabilizer is present at a level of no greater than 1500 ppm, alternatively no greater than 1000 ppm, alternatively no greater than 500 ppm, alternatively no greater than 250 ppm, alternatively no greater than 200 ppm, alternatively no greater than 150 ppm. In one embodiment of the invention, the stabilizer is present at a level of at least 20 ppm, alternatively at least 50 ppm, alternatively at least 75 ppm. Preferably, the amount of stabilizer is from 10% to 100%, more preferably from 70% to 100% of the total amount of MIT and OIT.

Latex paints may contain a variety of polymeric binders, including, e.g., acrylic polymers and vinyl acetate polymers, e.g., ethylene vinyl acetate. In one embodiment of the invention, the paint contains acrylic polymers, i.e., polymers having at least 75% monomer residues of (meth)acrylic acids and alkyl (meth)acrylate esters, more preferably at least 90%. The latex paints preferably have a pigment volume concentration {PVC, defined as [(volume of inorganic solids)/(volume of inorganic solids+volume of polymeric binder)]*100%} of 15% to 70%, more preferably 45% to 70%, more preferably from 55% to 70%.

Preferably, the thickener(s) is present in the paint at a level from 0.1% to 1.2%, alternatively from 0.1% to 1.1%, alternatively from 0.1% to 0.9%, alternatively from 0.15% to 0.6%, as a weight percentage of solid thickener in the total weight of the paint. One or more other thickeners may be present. In one embodiment of the invention, the thickener used in the latex paint comprises a hydroxyethyl cellulose (HEC). In one embodiment of the invention, the latex paint has less than 5% of polyurethane thickeners, alternatively less than 4%, alternatively less than 3%, alternatively less than 2%, alternatively less than 1%, alternatively less than 0.5%. In one embodiment of the invention, the latex paint is free of polyurethane thickeners.

Preferably, the total level of isothiazolone biocide in the paint is from 10 ppm to 2000 ppm. In one embodiment of the invention the isothiazolone biocide level is at least 20 ppm, alternatively at least 50 ppm, alternatively at least 75 ppm. In one embodiment of the invention, the isothiazolone biocide level is no greater than 1500 ppm, alternatively no greater than 1000 ppm, alternatively no greater than 500 ppm, alternatively no greater than 250 ppm, alternatively no greater than 200 ppm, alternatively no greater than 150 ppm. In one embodiment of the invention, the latex paint comprises MIT. In one embodiment of the invention, the MIT used in the latex paint contains less than 2% CMIT, alternatively less than 1%, alternatively less than 0.5%, alternatively less than 0.2%, alternatively less than 0.1%. Preferably, the total level of MIT and OIT in the paint is from 10 ppm to 2000 ppm. In one embodiment of the invention the total level of MIT and OIT is at least 20 ppm, alternatively at least 50 ppm, alternatively at least 75 ppm. In one embodiment of the invention, the total level of MIT and OIT is no greater than 1500 ppm, alternatively no greater than 1000 ppm, alternatively no greater than 500 ppm, alternatively no greater than 250 ppm, alternatively no greater than 200 ppm, alternatively no greater than 150 ppm.

The stabilizer can be added at any point during the paint-making process in any form (e.g., as an emulsion, dispersion, dry powder, paste or liquid). The stabilizer, isothiazolone biocide and thickener may be combined in the latex paint in any order or in any manner. In one embodiment of the invention, the thickener and stabilizer are added with the solid components of the paint, e.g., the pigments, and the biocide is added with the liquid polymer latex. In another embodiment, the stabilizer is added to the biocide prior to adding this combination to the paint. In another embodiment, the stabilizer and the biocide are added to the liquid polymer latex.

In one embodiment of the invention, the method comprises combining in a latex paint: (i) at least one stabilizer comprising a hindered amine, an unsaturated fatty acid, nicotinamide, or a thiodicarboxylic acid; (ii) at least one isothiazolone biocide comprising 2-methyl-4-isothiazolin-3-one or 2-n-octyl-4-isothiazolin-3-one; and (iii) at least one thickener comprising a polyurethane, a hydroxyethyl cellulose, a carboxymethyl cellulose, an alkali soluble emulsion polymer, a hydrophobically modified alkali soluble emulsion polymer or a hydrophobically modified hydroxyethyl cellulose.

EXAMPLES

The paint used as the basis for this study contained 22% of an acrylic latex, 22% water, 24% titanium dioxide, 14% talc, 7% clay, 9% calcium carbonate, and other minor ingredients including 0.25% hydroxyethyl cellulose thickener. A series of paints were prepared by adding MIT at 1000 ppm to the basis latex paint. This amount is ten-fold normal-use level, chosen to increase the resulting odor and allow easier detection and differentiation between samples. The stabilizer was added immediately prior to addition of the biocide. The paint had a PVC of 63.25%. The stabilized paints were then subjected to accelerated, in-can aging at 40° C. or 50° C. for 2 or 3 weeks. After heat-age, the paints were coated on a glass support and dried for 48 h. A sensory (olfactory) evaluation was conducted for the sulfury odor with the results listed in Table I.

An identical follow-up experiment was conducted with selected scavengers in combination with a typical use level of MIT (100 ppm). These results are reported in Table II.

TABLE I

Sensory evaluation of paint films containing various radical scavengers.

| Radical scavenger variation in paint containing 1000 ppm MIT (scavenger level in ppm) | Intensity of malodor from paint film after in-can heat age, coating, and air drying |
|---|---|
| no scavenger | medium to strong |
| 3,3'-thiodipropionic acid (1560) | weak |
| 4-hydroxy-2,2,6,6-tetramethylpiperidinoxyl (4-OH TEMPO) (1000) | none |
| 4-hydroxy-2,2,6,6-tetramethylpiperidine (1000) | weak to medium |
| N,N-diethylhydroxylamine (1000) | weak |
| nicotinamide (1000) | weak |
| TINUVIN 770[1] (1000) | weak to medium |
| 2,6-di-tert-butyl-4-methoxyphenol (1000) | very weak |
| 2,5-di-tert-butylhydroquinone (1000) | none |
| 2,6-di-tert-butyl-4-methylphenol (BHT) (1000) | very weak |
| IRGANOX MD1024[2] (1000) | weak to medium |
| linoleic acid (1000) | none |

[1]Hindered amine light stabilizer comprising a benzotriazole-substituted hindered phenol (available from Ciba Corp.)
[2]Hindered phenol light stabilizer (available from Ciba Corp.)

TABLE II

Sensory evaluation of paint films containing various radical scavengers.

| Radical scavenger variation in paint containing 100 ppm MIT (scavenger level at 100 ppm) | Intensity of malodor from paint film after in-can heat age, coating, and air drying |
|---|---|
| 1. no scavenger | weak to medium |
| 2. 4-hydroxy-2,2,6,6-tetramethylpiperidinoxyl - 4-OH TEMPO | none |
| 3. 2,6-di-tert-butyl-4-methoxyphenol | extremely weak |
| 4. 2,5-di-tert-butylhydroquinone | none |
| 5. 2,6-di-tert-butyl-4-methylphenol - BHT | extremely weak |
| 6. linoleic acid | none |

The invention claimed is:

1. A method for reducing odor arising from surfaces coated with latex paints; said method comprising combining in a latex paint: (i) at least one stabilizer comprising 2,6-di-tert-butyl-4-methylphenol, 2,6-di-tert-butyl-4-methoxyphenol, 2-tert-butyl-4-hydroxyanisole, 2-(1,1-dimethylethyl)-1,4-benzenediol, 2,5-di-tert-butylhydroquinone or 4-tert-butyl-catechol; (ii) at least one isothiazolone biocide comprising 2-methyl-4-isothiazolin-3-one or 2-n-octyl-4-isothiazolin-3-one; and (iii) at least one thickener comprising a hydroxyethyl cellulose, a carboxymethyl cellulose, an alkali soluble emulsion polymer, a hydrophobically modified alkali soluble emulsion polymer or a hydrophobically modified hydroxyethyl cellulose; wherein the stabilizer is present in an amount from 70% to 100% of a total amount of 2-methyl-4-isothiazolin-3-one and 2-n-octyl-4-isothiazolin-3-one.

2. The method of claim 1 in which the isothiazolone biocide is 2-methyl-4-isothiazolin-3-one and the thickener is hydroxyethyl cellulose.

3. The method of claim 2 in which the latex paint has less than 5% of polyurethane thickeners.

4. The method of claim 1 in which the latex paint has less than 5% of polyurethane thickeners.

5. A method for reducing odor arising from surfaces coated with latex paints; said method comprising combining in a latex paint: (i) at least one stabilizer comprising 2,6-di-tert-butyl-4-methylphenol, 2,6-di-tert-butyl-4-methoxyphenol, 2-tert-butyl-4-hydroxyanisole, 2-(1,1-dimethylethyl)-1,4-benzenediol, 2,5-di-tert-butylhydroquinone or 4-tert-butyl-catechol; (ii) at least one isothiazolone biocide comprising 2-methyl-4-isothiazolin-3-one or 2-n-octyl-4-isothiazolin-3-one; and (iii) at least one thickener comprising a polyurethane, a hydroxyethyl cellulose, a carboxymethyl cellulose, an alkali soluble emulsion polymer, a hydrophobically modified alkali soluble emulsion polymer or a hydrophobically modified hydroxyethyl cellulose; wherein the stabilizer is present in an amount from 70% to 100% of a total amount of 2-methyl-4-isothiazolin-3-one and 2-n-octyl-4-isothiazolin-3-one.

6. The method of claim 3 in which said at least one stabilizer comprises 2,6-di-tert-butyl-4-methylphenol, 2,6-di-tert-butyl-4-methoxyphenol or 2,5-di-tert-butylhydroquinone.

7. The method of claim 5 in which said at least one stabilizer comprises 2,6-di-tert-butyl-4-methylphenol, 2,6-di-tert-butyl-4-methoxyphenol or 2,5-di-tert-butylhydroquinone.

8. The method of claim 7 in which the isothiazolone biocide is 2-methyl-4-isothiazolin-3-one and the thickener is hydroxyethyl cellulose.

* * * * *